United States Patent [19]

Davies

[11] Patent Number: 5,608,387
[45] Date of Patent: Mar. 4, 1997

[54] PERSONAL IDENTIFICATION DEVICES AND ACCESS CONTROL SYSTEMS

[76] Inventor: John H. E. Davies, 4A Cowper Road, Berkhamsted, Hertfordshire, HP4 3DA, England

[21] Appl. No.: 244,346

[22] PCT Filed: Nov. 30, 1992

[86] PCT No.: PCT/GB92/02220

§ 371 Date: May 26, 1994

§ 102(e) Date: May 26, 1994

[87] PCT Pub. No.: WO93/11511

PCT Pub. Date: Jun. 10, 1993

[30] Foreign Application Priority Data

Nov. 30, 1991 [GB] United Kingdom ............... 9125540

[51] Int. Cl.⁶ .................................... H04Q 1/00
[52] U.S. Cl. ............. 340/825.34; 382/118; 340/825.31
[58] Field of Search ............. 340/825.34, 825.31; 235/382, 382.5; 382/2, 10

[56] References Cited

U.S. PATENT DOCUMENTS

| 3,924,105 | 12/1975 | Gassin et al. | 382/2 |
| 4,554,591 | 11/1985 | Kee | 382/2 |
| 4,581,634 | 4/1986 | Williams | 358/108 |

FOREIGN PATENT DOCUMENTS

| 2058417 | 4/1981 | United Kingdom . |
| 2112190 | 7/1983 | United Kingdom . |
| 2173970 | 10/1986 | United Kingdom . |
| 2223614 | 4/1990 | United Kingdom . |
| 8303018 | 9/1980 | WIPO . |

OTHER PUBLICATIONS

Patent Abstracts of Japan vol. 6 No. 32 Feb. 26, 1982—JP 56 149 880 Kenichi Nov. 19, 1981.

*Primary Examiner*—Brian Zimmerman
*Attorney, Agent, or Firm*—Robert W. J. Usher

[57] ABSTRACT

A lock (19) which by physical or logical means controls human access to an objective (29) such as a restricted area or a computer system is controlled by a data processing system (10) which has access to a store of authorised users (14) and a store of complex images (15), specifically images of human faces. Each authorised user knows certain ones of the complex images, and these key images are linked to an identity statement unique to that user. On receipt of an identity statement signifying an authorised user, a matrix of images including the key images is presented to the user on a display (12), and by means of a suitable input device (20) the user must identify which images are his key images in order to confirm authorisation and be permitted access. The user and image stores (18) may be carried in credit card form as a section of an optical disk. The high security of the system results from the inability of a person to communicate adequately to another the ability to recognise a third person or other complex image.

25 Claims, 4 Drawing Sheets

PERSONAL IDENTIFICATION DEVICES AND ACCESS CONTROL SYSTEMS

This invention relates to personal identification devices, and to various applications of such devices, which in particular include access control systems, as well as authentication and encryption systems. Examples of access control systems are door entry systems and computer access control systems. Such systems may include a lock, permitting or denying access. A lock may be physical, when used on a gate, or logical, as might be used in software access control.

There are many situations where it is desirable or necessary to control the access of personnel to certain objectives, which may be physical locations (such as large sites, specific buildings, or specific areas within buildings) or may be computer systems or parts thereof. Access to such objectives may need to be controlled for various reasons, such as to prevent malicious damage to or theft of either material equipment or data and information, to prevent fraud, or to preserve security of all kinds.

Access control systems are generally linked to personal identification devices, and many such systems and devices are known. Personal identification devices may be physical, such as key devices (e.g. encoded cards) or identity cards, or abstract, such as memorised passwords or personal identification numbers (PINs). Any system that relies on the possession of a physical device is at risk of being compromised by transfer of the device to unauthorised users, deliberately or by loss or theft, or damage to the device. These factors impose considerable burdens on system administrators to ensure that passwords and PINs are frequently changed and that operating standards are kept high enough to ensure that the integrity of the system is not broken.

One possible solution lies in the use of biometric devices which attempt to measure or recognise electronically personal characteristics such as fingerprints, palm prints, retina patterns, voices or facial characteristics, but most of these are as yet unreliable, complex, expensive and slow in operation.

The general object of the present invention is to provide a personal identification device and an access control system of high potential security that is relatively simple and reliable, difficult to transfer to another user either deliberately or accidentally, and (in certain embodiments) difficult to lose.

The principle underlying the invention is that people can recognise very complex images known to them (typically faces) but that the basis of that recognition, being mental and conceptual, cannot easily be transferred to others, In terms of the present invention, a complex image is considered to be an image that is recognisable if already known but not readily capable of unique description to a person to whom it is not known.

When a complex image is included in a set of similar but not identical images, as described hereinafter, that complex image should be distinguishable from the other images in the set, by the human senses of a person familiar with the image, within a certain time interval when the whole set is displayed. However, it should not be readily possible to describe the first image in terms which are sufficiently precise that another human being unfamiliar with that image can subsequently identify it among the others of the set. For this purpose it is assumed that normal unaided human senses are used to discern the image, and a similar time interval, and that reference to or comparison with the other images of the displayed set is not permitted as part of the description.

The use of measuring instruments and no time limitation to the display, or a recording facility, would make the unique description of any image, and its subsequent recognition, much easier, and it is to be understood that the terms used in this description of the invention assume the absence of such aids. Further, the duration of an image display may be a factor in determining whether or not an image meets the complexity requirement.

A preferred example of a complex image in a set of similar images is an image of one human face in a set of images of different human faces of similar general character.

It should be understood that an image need not necessarily be a visual image, but that subject only to the limitations of storage and reproduction, the image may be recognisable by any one of the five human senses. That is to say, there is no theoretical reason why tactile images, olfactory images, auditory images and gustatory images should not be used in accordance with the invention. For example, complex auditory images could be formed by playing recordings of the human voice. It would be difficult to describe one human voice among many similar voices such that the specific voice could be selected by another person who was not familiar with it (assuming that the different voices were, for example, speaking the same text).

In the following description, persons seeking authorisation or access to a controlled objective are referred to as users. Persons who are known to or authorised by the system are referred to as authorised users, and each authorised user is associated with a personal identity statement, which might be a code, a set of initials or the authorised user's plain name, which is known to and recognised by the system as denoting that user. Each authorised user will be linked with at least one complex image, which will be referred to as a key image for that user. Complex images which are not linked with that authorised user will be referred to as false images. It will be appreciated that a false image for one user might be a key image for another user. A user may be required to select one or more images from a display, and whatever means is used to make the selection, the identification of the selected images to the system is referred to herein as an image statement.

In a broad aspect, the invention provides a personal identification device comprising a store of identity statements and a store of complex images, including key images linked with specific personal identity statements and false images not associated with personal identity statements. Knowledge of an identity statement is not sufficient to authorise a user; the user must also identify the correct key image linked to that identity statement.

For practical reasons, visual images are at present preferred in the practice of the invention, and the following description will concern itself with visual images only. These may be of any convenient form, e.g. as monochrome or full colour pictures. They may be stylised, as line drawings or caricatures. Instead of faces, suitable subjects might include landscapes, houses, or personal possessions. In this latter category, personal baggage is a suitable subject in connection with air transport security and baggage tracing.

Any convenient form of storage may be used, especially digital storage techniques, such as optical disk units. Data compression techniques may be used to reduce storage requirements and to reduce communication line transmission times, with matching data expansion techniques being used to generate the images from their compressed forms.

A personal identification device as set out above could consist of an encoded optically readable card which, upon insertion in a complementary reader, would allow the user to identify himself by giving an identity statement, allowing the apparatus to locate, retrieve and display a key image linked to that identity statement, and himself identify that key image.

In a simple embodiment, the key image might be an image of the user, and the user could then identify the image by offering his own direct image for comparison and matching; or the key image could be retrieved from the store and displayed along with false images, and the user would be required to select the key image from among the false images. This latter method tan be made more complex by increasing the number of key images to be selected, by repetition, and in other ways as will be described.

The invention therefore also provides personal identification apparatus comprising a personal identification device as aforesaid and data processing apparatus provided with means for receiving an identity statement, means for reading the device, and means for displaying at least one key image from the device that is linked with the received identity statement. The apparatus may include means for displaying a plurality of false images from the device in addition to the said key image, means for receiving an image statement, and means for determining whether or not a received image statement corresponds to a key image.

The invention further extends to a method of controlling access by a human user to a controlled objective; to a lock; and to a method of operating a lock; as well as other aspects of access control systems, as hereinafter described and as set out in the claims.

Different embodiments of the invention will now be described, by way of example only, with reference to the accompanying drawings, in which.

Figure 1:
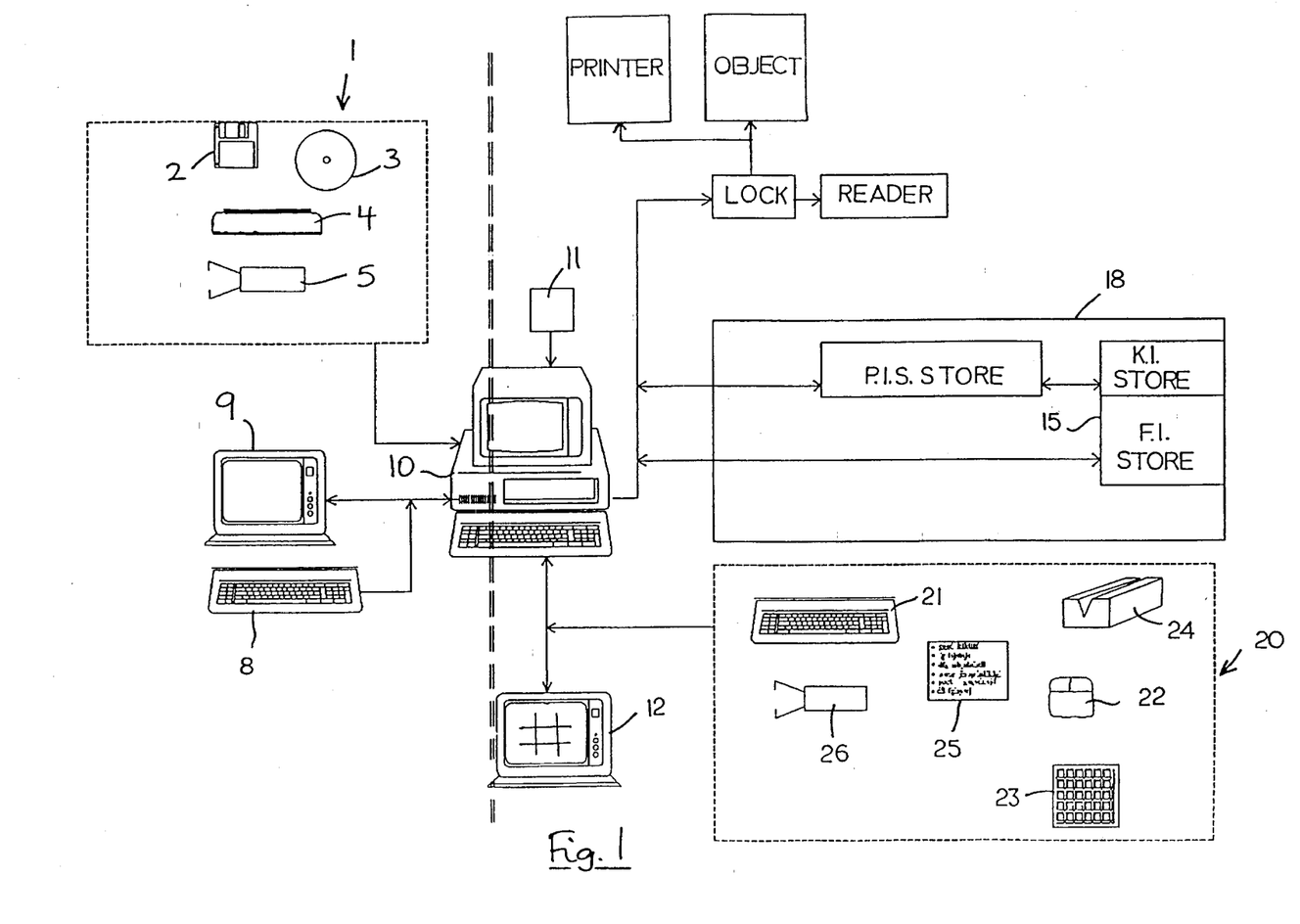
FIG. 1 is a diagrammatic representation of an access control system.

FIG. 1 shows a complete access control system centred on a control unit 30. Elements to the left of the vertical dashed dividing line are required only during the setting up phase, when authorised users and the key images to which they are linked are entered into the system, whereas the elements to the right of the vertical line are required subsequently, during the operational phase of the system.

Data processing within the system, which includes the central processing unit, the data stores, the communications lines and the input and output devices, is readily implemented by any suitable code or programming language and using conventional graphics handling routines adapted to the requirements of the invention.

During the setting up phase, it is necessary to load the system with complex images. This may be done with any convenient input device 1, such as a floppy disk 2 or an optical disk (CD-ROM) 3 which may contain image sets or image synthesis software. Alternatively, a scanner 4 may be used to digitise photographs and the like, or a digital video camera 5 may be used directly.

An authorised user to be entered on to the system is required to enter an identity statement, conveniently by means of a keyboard 8. Key images to be linked to that identity statement are then identified, either by selection from those already loaded or by inputting a new image by means of any of the input devices 1, and the resulting links between identity statements and key images are stored with them in the form of a secure reference table. This may be kept as a hidden file where a unique set of key images is coded against each personal identity statement.

It is then necessary for the user to learn to use the system, and in particular to confirm that he is able to identify the or each key image with which his personal identity statement is linked. This is achieved by displaying the key images together with false images on a display screen 9, and requiring the user to enter each time an image statement to select the key image. With reference to the control unit clock 11, the process can be speeded up until the user has learned to recognise his key images at the speed that will be needed during the operational phase.

The personal identity statement store 14 and the image store 15 containing key images 16 and false images 17 are preferably contained in read only memory and situated in a secure and remote storage unit 18.

During the operational phase, the user receives information from the system only by means of a display screen 12. This may be a touch screen, in which case it can also function as an input device. Alternative input devices 20 for use with the screen might be a keyboard 21 or a mouse 22. Still further input devices might include a key pad 23, a card reader 24, a push button select list 25 (in which a number of choices are displayed, each associated with a select button) and a digital video camera 26.

Using an appropriate input device 20, a user requiring authorisation to access a controlled objective gives the system his personal identity statement. He might be able to do this with an existing swipe card in the card reader 24, by selecting his name from the push button select list 25, by typing in his name at the keyboard 21, by entering a PIN at the key pad 23, or by making a preliminary identification of certain key images as will be described later.

If the identity statement corresponds to that of an authorised user, located in the store, the control unit 10 sends to the screen 12 a display of complex images, e.g. similar but different faces, in a matrix, suitably four rows of three images. In this example, these consist of three key images and nine false images. The images are arranged randomly in the matrix and displayed for a short time only, chosen to be long enough for the user to recognise the three key faces that are known only to him. The false images may be selected by the system for display with reference to their similarity to the key images, e.g. in sex, age, skin colour, hair type and so on, according to the degree of difficulty of selection that may be required.

Correct selection of the three key faces by means of a touch screen 12, keyboard 21 or key pad 23 which references the screen positions is interpreted by the control unit as authority to grant access and release a lock 19 controlling access to an objective 29. The lock may be physical, as for a door, may be logical, as for permitting or denying access to software on a computer system, or it may be both, for controlling access to a computer system as such. The lock may also release an identity card from a stripe card printer 27, which card is valid for a limited period and can be used for entry to further secure areas and also for use as a check out card when the authorised user leaves the secure area, for which purpose an exit card reader 28 is provided to operate the lock to permit departure.

Figure 2:
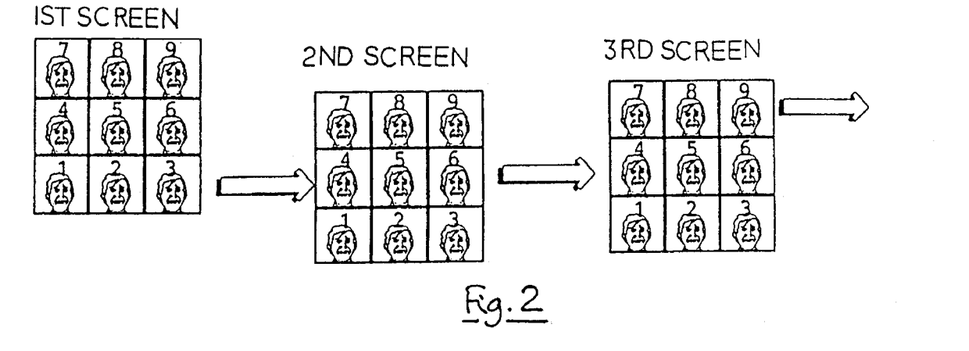
FIG. 2 illustrates three screens of image matrices.

A user's identity statement can also be entered through the medium of key images. Each authorised user is linked to a number of key images, preferably different from the three key images used for authentication as described above. FIG. 2 shows a matrix of nine faces displayed on the screen, and one of these faces is an entry key image for this user and for many others. In this case, it is face No 3. The user selects this face, following which the system displays a further matrix of nine different images, and again a selection of the appropriate entry key image (face No 6) is made.

This causes a third screen to display, with nine new face images in a new matrix. Correct selection of face No 9 results in the user having selected one of 9×9×9=729 possible combinations, with the qualification that since the key images are displayed in random positions in the three matrices, it is not readily possible for the user to pass the combination to anyone else. The system has functioned to provide a particularly secure form of PIN, following which the normal authentication procedures are begun. With this system even an illiterate or innumerate person could gain entry, provided that they were familiar with their key images.

Figure 3:
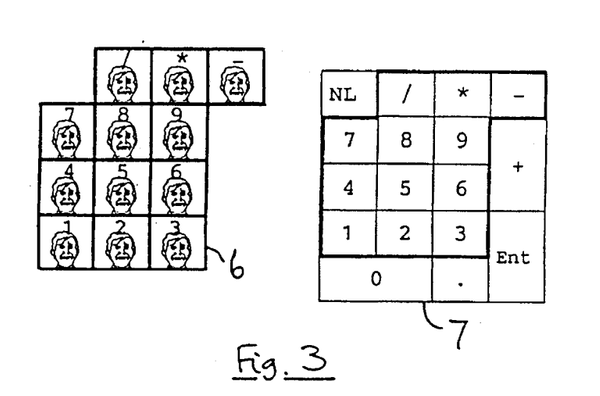
FIG. 3 illustrates how a matrix can be mapped to a keypad.

If a touch screen is not used, the matrix can be mapped to the keyboard or keypad so that to select an image it is only necessary to depress a key in a position corresponding to the position of the image in the matrix. An example is shown in FIG. 3, in which the locations of twelve images in a matrix 6 match twelve keys in a keypad 7. With just three key depressions or touches a person can be identified as being one in 729. A further three key depressions, as described above, confirms and authenticates the identity of the user. The matrix can be increased in size and number of images to cater for larger numbers of users.

Figure 4:
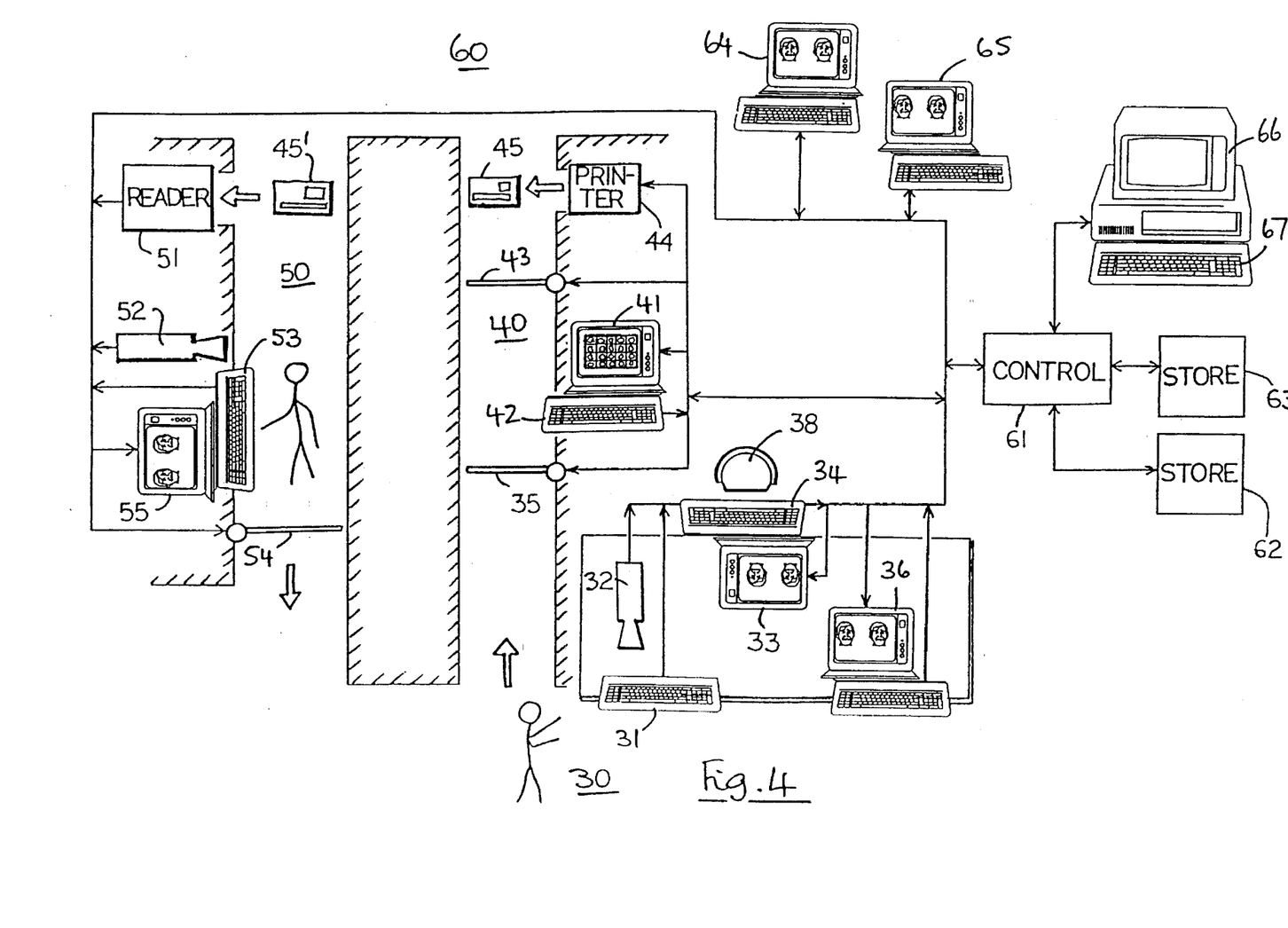
FIG. 4 shows one implementation of an access control system.

FIG. 4 shows how the invention might be implemented as an access control system. The major features are a reception and security desk area 30, an entrance passage 40, an exit passage 50, and a controlled area 60. Broadly, the reception and security desk area and the exit passage implement a first level of security, and the entrance passage implements a second level of security.

The desk area has a panel 31 into which a user enters his or her identity statement, which is fed to a control unit 61. A video camera 32 is directed at the user, and its output is passed to an image RAM store 62 where it is stored. The system images are stored in a ROM store 63, and the appropriate key image is extracted by the control unit 61 in response to the user's identity statement. The two images—the key image and the image from the video camera—are displayed on a display monitor 33 with an associated keyboard 34. A security guard in a chair 38 operates the keyboard, and this (via the control unit 61) opens a gate 35.

The monitor and keyboard 33 and 34 are duplicated by a monitor/keyboard unit 36 in the desk area, visible to and operable by a following user, and monitor/keyboard units 64, 65 etc. in the controlled area 60 where they can be operated by users who have already gained access to the controlled area 60. The gate 35 can be opened by any of these units, as well as by the unit 33.

With several such monitor/keyboard units, it may also be desirable to provide a barring function, so that if an observer at any of the units considers that there is a mismatch between the two images, he can prevent the gate from opening.

The entrance passage 40 has a monitor 41 and associated panel 42. Once the user has gained access to this area, he enters his identity statement on the panel 42. An array of 5×4 images from the ROM image store 63 is presented on the monitor 41 by the control unit 61, and the user has to identify the three key images which are associated with him. The control unit 61 thereupon opens a gate 43, and causes a card printer 44 to print a card 45 for the user. The user goes through the gate 43 and takes the card 45, thereby gaining access to the controlled area 60.

The card 45 acts as a physical identifier for the user, and may be used to control access to different regions within the controlled area 60. The card may carry any convenient control information, such as the date. It may also carry an image of the user (derived from the image stored in the RAM image store 62), so that the user and card can be matched, if challenged. The image may be carried in graphical form, or in an encoded form which can be decoded by inserting the card in a suitable reader (not shown).

This card is essentially a conventional access control card. An existing card-controlled access system can thus be upgraded by having the present system added to it, while the existing card system remains in use.

When the authorised user leaves, he enters the card 45' in a card reader 51 in the exit passage 50. The user is also viewed by a video camera 52, and enters his identity statement in a panel 53. The direct image from camera 52 and the stored system image from the ROM image store 63 are then displayed on suitable monitors, for someone to check that they match and enter a signal which opens a gate 54 and releases the user.

If desired, the exit procedure may be at the second level, in which case there will be a monitor 55 associated with the panel 53, and the array of 5×4 images from the ROM image store 63 will be presented on the monitor 41 by the control unit 61, with the user having to identify the three key images which are linked with his identity.

The system may of course check that the identity recorded on the card 45' matches the identity statement entered by the user in the pane 153.

The system also includes a control monitor 66, with panel 67, linked to the control unit 61 for updating the system. The monitor 66 may be arranged to implement second level security, presenting an array of 5×4 images from the ROM image store 63, and permitting access to the control unit 61 only if the user successfully identifies the three images which are associated with him. This security can be increased further by, for example, requiring two different users to identify themselves within a given period.

Obviously the physical structures of the system—the control unit 61, the control monitor 66, the ROM and RAM image stores 62 and 63, and the wiring of the system—must be adequately protected against interference. The use of ROM storage for most of the images makes it harder for unauthorised changes to be made to those images.

The first level entry control can be arranged to be controlled solely from within the controlled area, i.e. without the use of an operator at the reception desk. This would prevent the possibility of bribery or intimidation of such an operator. The use of two gates 35 and 43 in the entry passage 40 means that an intruder who passes the first level check but fails the second level check is trapped in that area, and cannot merely walk away without being challenged. The invention has been tested in trials which evaluated the abilities of volunteer subjects, who were unaware of the purpose of the tests, to learn, recognise, discriminate between, and describe, complex images.

During the setting up phase, each subject first studied computer screen displays of photographic images of three human faces, which were to be that subject's key images. Subjects were then presented with a 3×3 array of three key faces and six false faces and required to identify their three key images accurately within 15 seconds for six consecutive trials.

Surprise repeat tests on four of the subjects 24 hours later showed that all four could still make six consecutive correct selections. The use of a 4×3 matrix did not alter performance level.

Ten subjects were tested, after successfully selecting three key images from a 3×3 matrix six times in 15 seconds, by reducing the times allowed until the subject failed to identify the three key faces six times in succession. Identification was by means of keyboard entry. Another group of nine subjects carried out the same exercise on computer screen images which were line drawn faces synthesised by a commercially available computer program. The average minimum identification times of the two groups were 5.2 and 4.6 seconds respectively, which is not considered significantly different, and the fastest times were 2.0 seconds in each group.

The subjects were then invited to describe their key faces. These descriptions were then given to four others who were then asked to identify the three faces in an array using only the verbal descriptions. The descriptions proved to be an entirely useless means of identification: responses were virtually at chance level.

After identical learning procedures to those described above, further subjects were presented with their key images and were required to key in not only the position of the key images on the array, but also a corresponding one-character label and the order in which they appeared at initial presentation. Six subjects were given photographed faces and four were given synthesised faces. The lowest inspection times yielding six consecutive correct responses were 6.4 seconds and 6.0 seconds respectively.

Some of the subjects at the same time also learned a six digit number, representing a PIN code, to the same criteria. Five of these subjects, who were unaware of the possibility of further testing, were recalled to the laboratory after an interval of about 11 weeks. After this time, not one subject could remember his PIN. Nevertheless, four recognised all three of their key images from a 3×3 matrix without hesitation, and the fifth subject correctly identified two of his three key images.

It was clear from these results that it is easy to train people to recognise three faces and to provide a label for each. Most people with only minimal practice require no more than a 5 second view of a 3×3 or 3×4 array to make accurate selections of their three key images. Further, not only were the subjects unable to communicate their key images to others, but after many weeks without practice they were able to recall their own key images much more reliably than they could recall their PIN codes.

Figure 7:
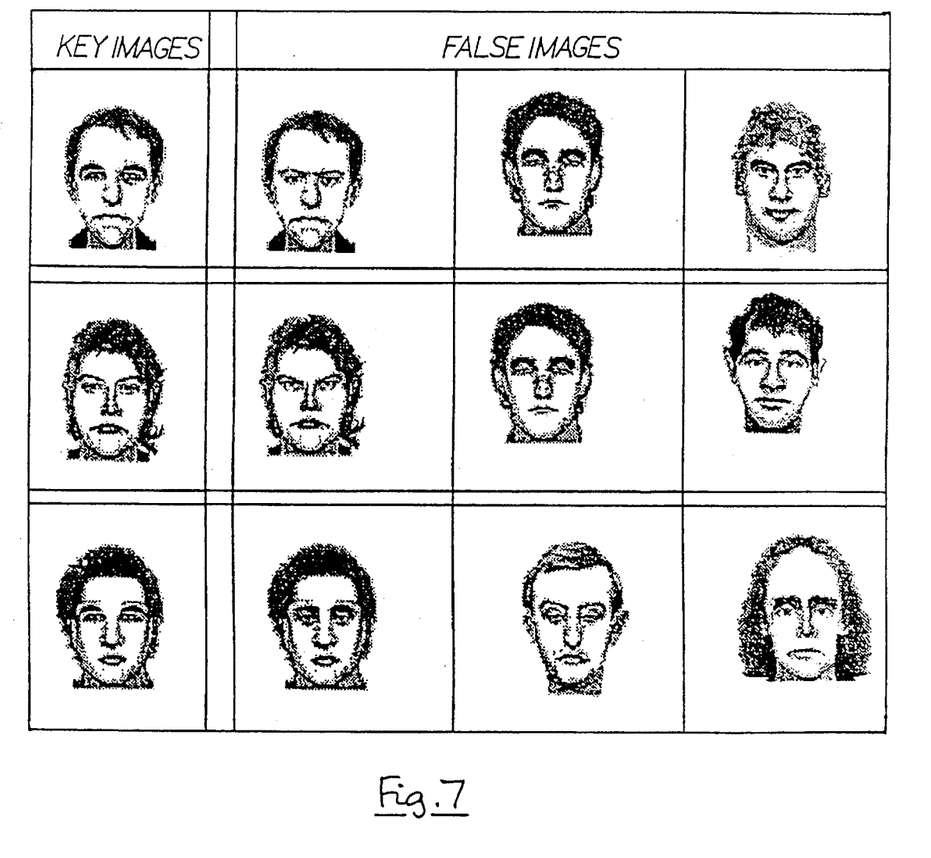
FIG. 7 shows sample complex images that can be used.

It was also apparent from further tests that the degree of similarity between images could be adjusted to suit different operating requirements. FIG. 7 shows an array of complex images. In each row, the left hand image is the key image. The next image to the right of the key image is very similar, differing only in the construction of the eyes. The third image in each row is randomly different from the key image, while the fourth (right hand) image in each row is highly dissimilar to the key image, in that the faces differ in every variable. Only when the false images were very similar to the key images, i.e. as in the second column, was any deterioration noted in the subjects' ability to select their key images, but even then their performance was considered to be reasonably acceptable.

The invention can be applied and varied in many different ways.

For computer access control, the invention may be expressed as software, hardware or firmware, or a combination. Protection may be for a whole system, a network, a terminal, a stand alone or even a portable computer. Protection may be for the whole system before or after booting, for specific programs or even for specific files. The display would normally be the display of the computer itself or of a terminal connected to it. However the system can have its own display, particularly if the images are presented in a sequence instead of in a matrix and the display is a small LCD screen.

The protected computer may be the computer controlling the door entry system as described above. Any system controlled by a computer can be protected, including weapon arming systems, body scanners, chemical process controls, and nuclear energy controls. The invention may be embodied in a separate micro computer, built into the main computer case or even into the keyboard or monitor, and communicating with the control computer by wire or electromagnetic waves (e.g. a microwave or infra-red link). This hardware implementation would be advantageous for some high security applications. The access control computer being in the keyboard makes it very easy to install, and the keyboard to computer physical connection may be made sealed and/or unique. The access control system can be installed in a network server and/or in workstations, in mainframes or in slaves.

Extra security may be achieved by scrolling or building up the matrix display one or more images at a time, with the full matrix being displayed for only tenths of a second. This makes it easier for a person to concentrate, reduces the display time and makes still photography difficult. A 3×3 matrix may be displayed bottom row only for 0.4 seconds, bottom two rows together for a further 0.4 seconds, and all three rows for only 0.2 seconds, which has been found sufficiently long for a regular user to locate and identify his three key images. This does not give time for an observer to learn those images.

The display may only occur while the user holds two keys depressed which are separated and positioned so that both the user's hands are occupied and the user is prevented from pointing at the key images.

The matrix display format may mirror or be mapped to the keyboard layout so that the user's finger goes to the key that is in the same relative position as the image, as shown in FIG. 3.

The display screen and input devices may be situated so that they cannot easily be seen by an observer other than the user, such as by the use of masking screens or by recessing the equipment.

Figure 5:
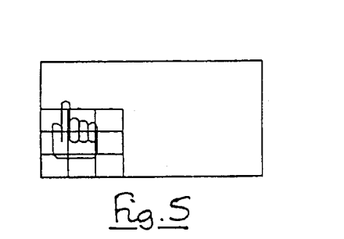
FIG. 5 illustrates the use of a touch screen in the invention.

The image size and matrix layout for a touch screen may such that a hand obscures much of the matrix when touching takes place, as shown in FIG. 5.

The images may have to be selected in a given sequence.

Against each image an alphabetic letter identifier may have to be entered. This is different to a password since the order of letters is according to the order of the images. For example if the three key images displayed are in positions 3, 5 and 9 the key entries are not just 3, 5 and 9 but say 3 R, 5 L and 9 B if the faces were of people with the names of Reg, Len and Brian. The right identifier must go with the right image. This measure greatly reduces the probability of a random correct selection.

The fact that the images cannot be described means they cannot be noted. Therefore any attempt at successive iterations even by a computer will be extremely difficult since there can be no record of what combinations have already been attempted. The positions of a given image in a matrix are random and cannot be predicted.

Means may be incorporated to ensure that the user who successfully logged on is still the same person at the keyboard. This may be apparent as a request to type the person's name or some other word at random intervals.

The nature of the images presented can be real faces, some known only to the user, some known only to the security authority, and some unknown to anyone. For high security there should always be at least one image whose identity is unknown, so that a photograph can never be available. The faces may not be of real people at all but can be computer generated composite faces or totally computer generated synthetic faces. These faces could be generated when needed from a stored parameter file as distinct from an image file. They could be randomly generated.

The number of key images can be any number, or any number from a possible any number. For example, the user remembers five key images faces and the matrix could display any three of them. Additionally there can be several matrices displayed in sequence to increase security.

A real time camera image can be compared by machine with a stored correct image, instead of or in addition to matching by an already authenticated user.

The invention can be made portable, as in a personal identification device, by separating the components of the system. The storage unit containing the personal identity statement store and image store (FIG. 1), together with the information required to link identity statements with key images, can be located anywhere. This can be in a "smart card" or high memory capacity card or device. The invention can act as an authenticator on top of existing or proposed smart or dumb card systems to detect card transfer.

Figure 6:
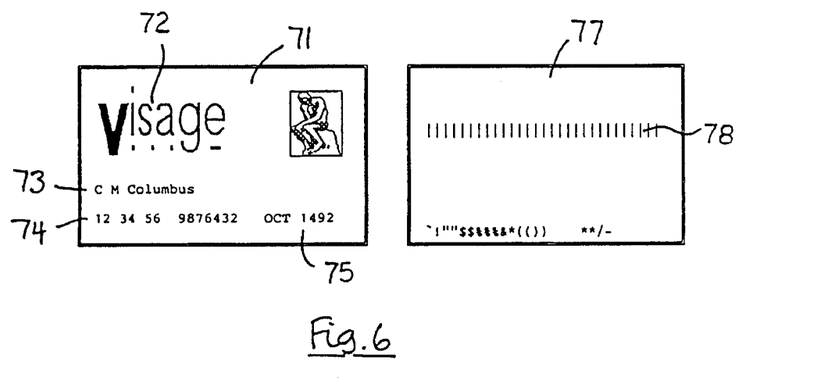
FIG. 6 shows one implementation of a personal identification device.

One embodiment with consequences for charge cards, credit cards, cash cards and the like (i.e. payment cards in general) is to hold the data on optical compact disk, or on a section of such a disk. The payment card disk can be of the same dimensions as a conventional credit card, as shown in FIG. 6. The optically coded data can include tens of thousands of records, so that thousands of people can have the same card and the production cost per record is very low. However, a given record will only be accessible by one person, through his personal identity statement and key images.

The card can be read by use of a carriage suitably shaped and sized to hold the card in a conventional CD-ROM reader. This reader links the card to the remaining elements of the whole control system.

With reference to FIG. 6, the card can carry the usual visible data printed or even embossed on its face 71, i.e. the names of the issuing authority 72 and of the account holder 73, together with the account number 74 and the expiry date 75. The reverse face 77 of the card can have the usual magnetically coded stripe 78 to allow it to be used conventionally. A store card of this format could even hold a complete store catalogue, allowing secure home shopping over a telephone or satellite link.

The invention can also be used as an encryption key. The key images have to be known by people at both ends of the transmission for decoding to be achieved. One key image common to both users could itself be used as an encryptor, each pixel of the image being an encryption "bit".

The invention may also be used for the protection of computer software against use after illegal or unauthorised copying. It is very difficult to prevent copying, and copying is sometimes really necessary, but the invention addresses the main alternative which is to make an illegal or unauthorised copy inoperable. The software is protected by a logical lock until the user has been authorised in accordance with the invention.

For example, a software product as shipped incorporates a plurality of key images and false images, the number of key images depending on how many users the software is licensed for. When the program is installed on a machine the key images are presented for selection. The installer selects an image and proves after several attempts, e.g. three, that it has been remembered. This image is then deleted as a selectable key image. Each installation of another user is similar, until all the key images are used up. In the event of an unauthorised copy the unauthorised user would not be able to make the system operable because he would not know the key and an authorised person would find it difficult to transfer his key. The availability of unused keys may be limited to a responsible system supervisor whose own access unlocks their availability.

I claim:

1. A personal identification device comprising a store of personal identity statements and a store of complex images including key complex images linked with personal identity statements and false complex images not associated with personal identity statements, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

2. A personal identification device according to claim 1 including an optical disk having a section on which both stores are encoded.

3. A personal identification device according to claim 1 including a digital storage device in which both stores are encoded.

4. Personal identification apparatus comprising a personal identification device comprising a store of personal identity statements and a store of complex images including key complex images linked with specific personal identity statements and false complex images not associated with personal identity statements, in combination with data processing apparatus provided with means for receiving a personal identity statement, means for reading the personal identification device, and means for displaying from the personal identification device at least one key complex image that is linked with the personal identity statement received, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

5. Apparatus according to claim 4 including means for displaying a plurality of false complex images from the device in addition to the said key complex image, means for receiving an image statement, and means for determining whether or not a received image statement corresponds to a key complex image.

6. A method of controlling access by a human user to a controlled objective requiring the user to enter an identity statement into data processing apparatus, retrieving with said apparatus a key complex image linked with that identity statement from a store of complex images, displaying that key image, requiring the user to correctly identify that key image, designating the user an authorised user only if that identification is correct, and permitting an authorised user access to the objective, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

7. A method according to claim 6 wherein the key complex image is displayed as part of a displayed set of stored complex images, and the user is required to identify the key complex image by selecting it correctly from the set.

8. A method according to claim 7 including the steps of retrieving a plurality of key complex images linked with the identity statement and a plurality of false complex images from the stored complex images; displaying an array of assorted retrieved key and false images to the user for a limited time; accepting image statements identifying images selected from the array by the user; determining whether the image statements match the displayed key complex images linked with the identity statement; and if so, permitting access.

9. A method according to claim 8 wherein the array is a matrix of images of which only some are displayed initially, and others are progressively added until the matrix is complete; and the display is terminated before the image statements are accepted from the user.

10. A method according to claim 6 wherein the key image is an image of an authorised user, and the user is required to correctly identify that image by offering his own real time image for matching with the key image.

11. A method according to claim 10 wherein the real time image is derived from a video camera and is both stored and displayed adjacent the key image for visual matching.

12. A method according to claim 6 wherein access is permitted by setting a lock to an open state.

13. A method of controlling access by a human user to a controlled objective according to claim 6 wherein the complex images are images of human faces.

14. A lock capable of a closed state in which one of physical and logical means denies human access to an objective and an open state in which such access is permitted, and provided with control means adapted to receive a request for access, to determine whether access is to be permitted; and to control the state of the lock accordingly; wherein the control means comprises:

a) a store of authorized users;

b) a store of complex images including key complex images linked with authorized users; a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description, c) means for receiving a personal identity statement and determining whether it relates to an authorized user from the user store;

d) means for displaying a set of complex images, including a key complex image set uniquely linked with the authorized user identified by means (c);

e) means for receiving an image statement;

f) means for comparing the image statement with the unique set of images in the displayed set; and g) means for setting the state of the lock to open only when the image statement matches the unique set.

15. A method of controlling human access to an objective which comprises:

a) storing a list of authorized users;

b) storing a plurality of sets of complex images; a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description, c) linking a set of complex images with each authorized user;

d) detecting a request for access associated with a user identity statement;

e) determining whether the identity statement corresponds to an authorized user on the stored list;

f) displaying a set of complex images including at least one key complex image from the set linked with that authorized user and at least one similar complex image, when the identity statement corresponds to an authorized user on the stored list;

g) determining whether all the displayed key complex images, and only those complex images, are selected;

h) permitting access to the objective when all the displayed key complex images, and only those complex images, are selected; and i) otherwise, denying access.

16. A method according to claim 15 wherein steps (f) and (g) are repeated sequentially whereby to increase the probability that a successful request for access is not due to a chance result.

17. A method of operating a lock comprising operatively connecting the lock to data processing apparatus, whereby the lock is switchable from a closed state to an open state by a signal receivable from the said apparatus, and transmitting said signal to the lock upon actuation of the apparatus by an authorized user, including the step of determining whether a user is authorized; wherein the said step comprises the sub-steps of requiring the user to enter an identity statement into data processing apparatus, retrieving with said apparatus a key complex image linked with that identity statement from a store of complex images, displaying that key complex image, requiring the user to correctly identify that key complex image, designating the user an authorized user only when that identification is correct, and permitting an authorized user access to the objective, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

18. An identification system comprising a store of identity statements for identifying respective users and a store of complex images, at least some of which are key complex images which are associated, respectively, with predetermined different ones of the identity statements and are for selection by respective users to verify their respective identities, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

19. A payment card comprising a personal identification device comprising an optical disk having a section in which both a store of personal identity statements and a store of complex images including key complex images linked with specific personal identity statements and false complex images not associated with personal identity statements are encoded, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

20. A payment card according to claim 19 wherein the complex images are images of human faces.

21. Personal identification apparatus, according to claim 19 wherein the complex images are images of human faces.

22. A lock capable of a closed state and an open state and having control means for controlling the state of the lock, wherein the control means comprises means for receiving an identity statement from a user, means for displaying a key complex image linked with that identity statement, and means for setting the state of the lock to open in response to correct identification of the key complex image by the user, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

23. A lock according to claim 22 wherein the complex images are images of human faces.

24. A personal identification device according to claim 1, wherein the complex images are images of human faces.

25. Personal identification apparatus comprising a payment card having a personal identification device comprising an optical disk having a section in which both a store of personal identity statements a store of complex images including key complex images linked with specific personal identity statements and false complex images not associated with personal identity statements are encoded, in combination with data processing apparatus provided with means for receiving a personal identity statement, means for reading the personal identification device, and means for displaying at least one key complex image from the personal identification device that is linked with the identity statement received, a complex image being an image that is recognizable when already known but not readily capable of unique description to a person to whom it is not known so that when a particular complex image is included in a set of similar but not identical complex images, the particular complex image is distinguishable from other complex images in the set, by the human senses of a person familiar with the particular complex image, within a predetermined time interval when the whole set is displayed, but it is not readily possible to describe the particular complex image in terms which are sufficiently precise that another human being unfamiliar with the particular complex image can subsequently identify it among other complex images of the set using normal unaided human senses to discern the particular image, and within a time interval similar to the predetermined time interval, and provided that reference to and comparison with other complex images of the displayed set is not permitted as part of a description.

* * * * *